(12) United States Patent
Awakawa

(10) Patent No.: US 7,025,160 B2
(45) Date of Patent: Apr. 11, 2006

(54) APPARATUS FOR ATTACHING ELECTRICAL COMPONENTS TO A VEHICLE

(75) Inventor: Hirobumi Awakawa, Iwata (JP)

(73) Assignee: Suzuki Motor Corporation, Shizuoka-ken (JP)

( * ) Notice: Subject to any disclaimer, the term of this patent is extended or adjusted under 35 U.S.C. 154(b) by 187 days.

(21) Appl. No.: 10/682,079

(22) Filed: Oct. 10, 2003

(65) Prior Publication Data

US 2004/0079569 A1    Apr. 29, 2004

(30) Foreign Application Priority Data

Oct. 28, 2002   (JP)   ............................. 2002-312856

(51) Int. Cl.
*B60R 16/04*   (2006.01)
(52) U.S. Cl. ..................... 180/68.5; 903/907; 903/952
(58) Field of Classification Search ............... 180/65.1, 180/65.3, 65.8, 68.5, 69.4; 429/99; 903/907, 903/952
See application file for complete search history.

(56) References Cited

U.S. PATENT DOCUMENTS

| | | | | |
|---|---|---|---|---|
| 5,366,246 A | * | 11/1994 | Chen et al. ................. | 280/834 |
| 5,390,754 A | * | 2/1995 | Masuyama et al. ........ | 180/68.5 |
| 5,392,873 A | * | 2/1995 | Masuyama et al. ........ | 180/68.5 |
| 5,534,364 A | * | 7/1996 | Watanabe et al. ............. | 429/61 |
| 5,641,031 A | * | 6/1997 | Riemer et al. ............. | 180/65.3 |
| 5,794,979 A | * | 8/1998 | Kasuga et al. .............. | 280/834 |
| 6,094,927 A | * | 8/2000 | Anazawa et al. ............. | 62/239 |
| 6,188,574 B1 | * | 2/2001 | Anazawa ..................... | 361/695 |
| 6,220,380 B1 | * | 4/2001 | Mita et al. ................. | 180/65.1 |
| 6,315,069 B1 | * | 11/2001 | Suba et al. ................. | 180/68.5 |
| 6,632,560 B1 | * | 10/2003 | Zhou et al. .................. | 429/99 |
| 6,662,891 B1 | * | 12/2003 | Misu et al. ................ | 180/68.1 |
| 6,668,957 B1 | * | 12/2003 | King ......................... | 180/68.5 |

FOREIGN PATENT DOCUMENTS

| | | |
|---|---|---|
| JP | 2001-328439 | 11/2001 |
| JP | 2002-205555 | 7/2002 |
| JP | 2002-205556 | 7/2002 |

OTHER PUBLICATIONS

English Language Abstract of JP-2001-328439.
English Language Abstract of JP-2002-205555.
English Language Abstract of JP-2002-205556.

* cited by examiner

*Primary Examiner*—Jeff Restifo
(74) *Attorney, Agent, or Firm*—Greenblum & Bernstein, P.L.C.

(57) ABSTRACT

A structure for mounting electrical components to a vehicle. The structure includes a rear floor pan incorporating a U-shaped part transversely centered in the vehicle. Floor pan wing panels extend from each end of the U-shaped part and connect to vehicle side panels. An electrical component mounting rack includes a first frame attached to the U-shaped floor panel part, and a second frame attached to the top of the first frame and also to the floor pan wing panels. An electrical inverter device is mounted to the first frame and batteries are mounted to the second frame. The first and second frames form a structure that reinforces the rear floor pan in a manner capable of adequately supporting heavy electrical drive train components.

15 Claims, 5 Drawing Sheets

APPARATUS FOR ATTACHING ELECTRICAL COMPONENTS TO A VEHICLE

BACKGROUND OF THE INVENTION

1. Field of the Invention

The present invention relates to an apparatus for attaching electrical components to a vehicle. More specifically, the present invention relates to an apparatus for attaching electrical components to a vehicle in which the apparatus increases the rigidity of the rear floor pan of the vehicle.

2. Description of Background Information

Electrical power train components have been conventionally mounted to a vehicle by attaching batteries and other heavy electrical components directly to the rear floor pan of the vehicle. As the floor pan is often incapable of rigidly supporting the weight of these components, a sufficiently rigid mounting structure for electrical power train components has been difficult to obtain.

The prior art includes structures that mount electrical drive train components to a rear floor pan behind a vehicle seat. For instance, Japanese Unexamined Patent No. 2002-205556 (see pages 4 and 5 and FIG. 1) discloses a structure conventionally employed to mount electrical power train components to a vehicle including battery trays on which multiple batteries are placed before installation to the vehicle, thereby allowing the structure to be divided among battery trays, each having a weight that can be easily handled by the assembly technicians.

Japanese Unexamined Patent No. 2002-205555 (see claims and pages 3 to 5 and FIGS. 1 to 3) discloses a structure in which both ends of a battery hold-down bracket are attached to a battery tray. A U-bolt connects to the battery tray through a bead part located between each battery, the bead part locating each battery in respect to the hold-down bracket, and each U-bolt joining to a groove provided within the bead part.

Japanese Unexamined Patent No. 2001-328439 (see claims and FIG. 1) discloses a structure in which right and left side gussets are attached to the top of the vehicle's rear suspension members, such that the stress applied to the gussets is received directly or indirectly through the battery case and connecting plates.

In order to solve the shortcomings of the prior art, the present invention proposes a structure through which electrical drive train components may be more rigidly supported by the rear floor pan behind the seat of a vehicle. The invention provides for a rear floor pan that includes a U-shaped part transversely oriented in the center of the vehicle, and floor pan wing panels, which are formed as extending members on both sides of the U-shaped part, that connect to a vehicle's side panels. An electrical component mounting rack is provided that includes a first frame fixedly attached to the U-shaped part of the rear floor pan, and a second frame fixedly attached to the top of the first frame, and is also attached to the floor pan wing panels. An electrical inverter device is installed on the first frame and electrical batteries are installed on the second frame.

SUMMARY OF THE INVENTION

Accordingly, one aspect of the present invention is to provide an apparatus for attaching electrical components to a vehicle. The apparatus includes a rear floor pan that is positioned behind a seat and includes a U-shaped part (U-pan) oriented in the transverse direction aligned centrally with respect to the vehicle. The apparatus also includes floor pan wing panels that connect to side panels of the vehicle and are formed at each side of the U-shaped part. An electrical component mounting rack is provided that includes a first frame fixedly attached to the U-shaped part of the rear floor pan and a second frame fixedly attached to the top of the first frame and to the floor pan wing panels. An electrical inverter device is provided that is attached to the first frame, and electrical batteries are attached to the second frame. The structure may include an approximately C-shaped battery stay positioned over the batteries, in which both ends of the stay are attached to a battery tray, and battery hold-down rails, positioned above the batteries, that are attached to the battery stay.

According to another aspect of the present invention, an apparatus is provided for attaching electrical components to a vehicle. The apparatus includes a floor pan including a substantially U-shaped member that is positioned along a central axis of the vehicle. Floor pan wing panels extending from lateral sides of the U-shaped member are attached to side panels of the vehicle. An electrical component mounting rack is provided that includes a first frame that is attached to the U-shaped member of the floor pan, and a second frame that is attached to a top side of the first frame and to the floor wing panels. An electrical inverter device is also included and is mounted to the first frame. A battery is supportable in the second frame.

The apparatus may include a battery tray, a battery stay extending over the battery and being attached to the battery tray, and a battery hold-down rail that is positioned above the battery. The battery hold-down rail may be attached to the battery stay, and the battery stay be substantially C-shaped. The second frame may include a cross brace that is connected to the battery stay and the first frame may include connecting members. The floor pan may be positioned behind a seat of the vehicle.

Therefore, the first and second frames function as reinforcing members that increase the rigidity of the rear floor pan to provide an adequate foundation for the installation of heavy electrical drive train components.

BRIEF DESCRIPTION OF THE DRAWINGS

The above, and other objects, features and advantages of the present invention will be made apparent from the following description of the preferred embodiments, given as non-limiting examples, with reference to the accompanying drawings, in which.

DETAILED DESCRIPTION OF THE PREFERRED EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, and the description is taken from the drawings making apparent to those skilled in the art how the forms of the present invention may be embodied in practice.

The invention provides for a structure in which first and second frames, to which heavy electrical drive train components are mounted, function as reinforcing members that increase the rigidity of the rear floor pan in order to provide adequate support for the aforesaid components.

Figure 2:
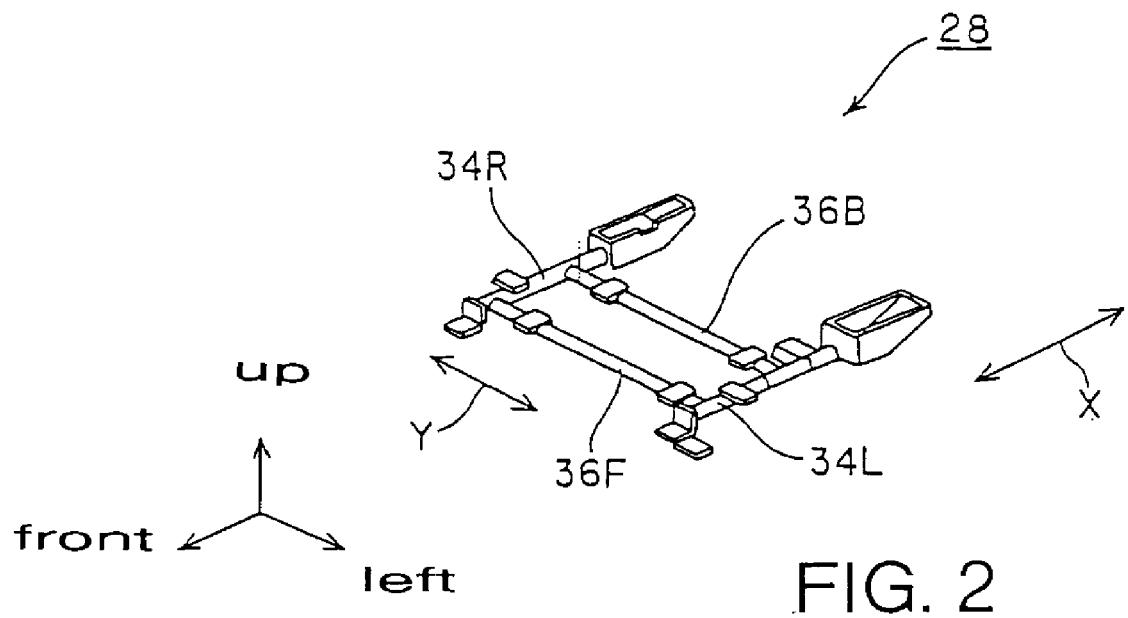
FIG. 2 is a perspective view of a first mounting frame, according to an aspect of the present invention.
Figure 3:
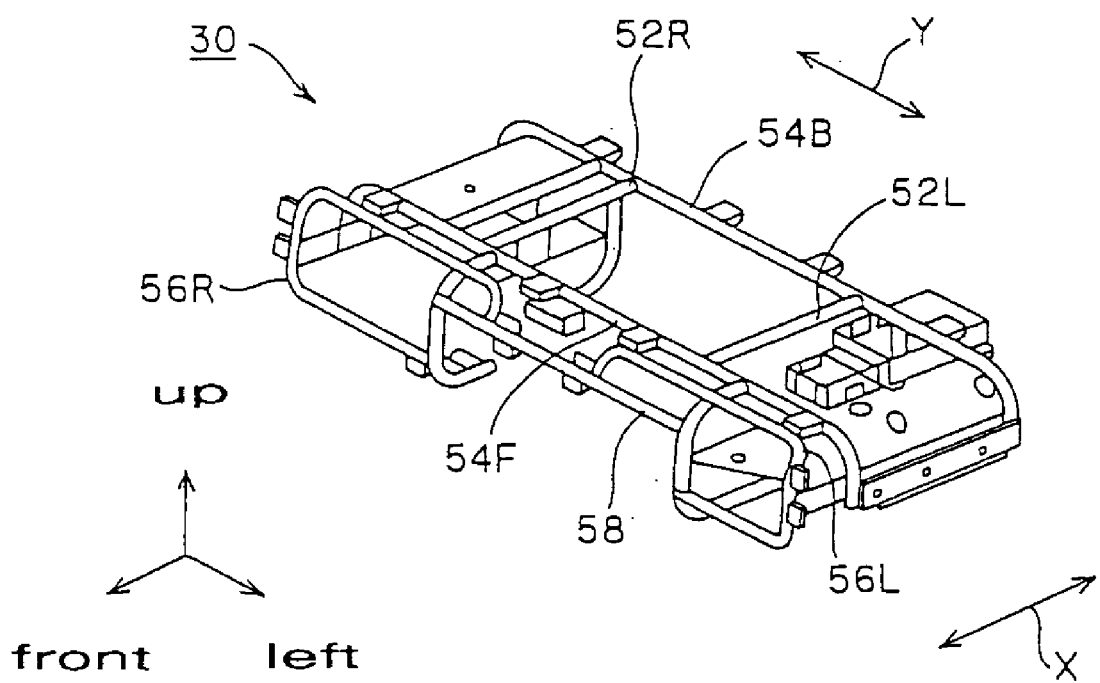
FIG. 3 is a perspective view of a second mounting frame, according to an aspect of the present invention.
Figure 4:
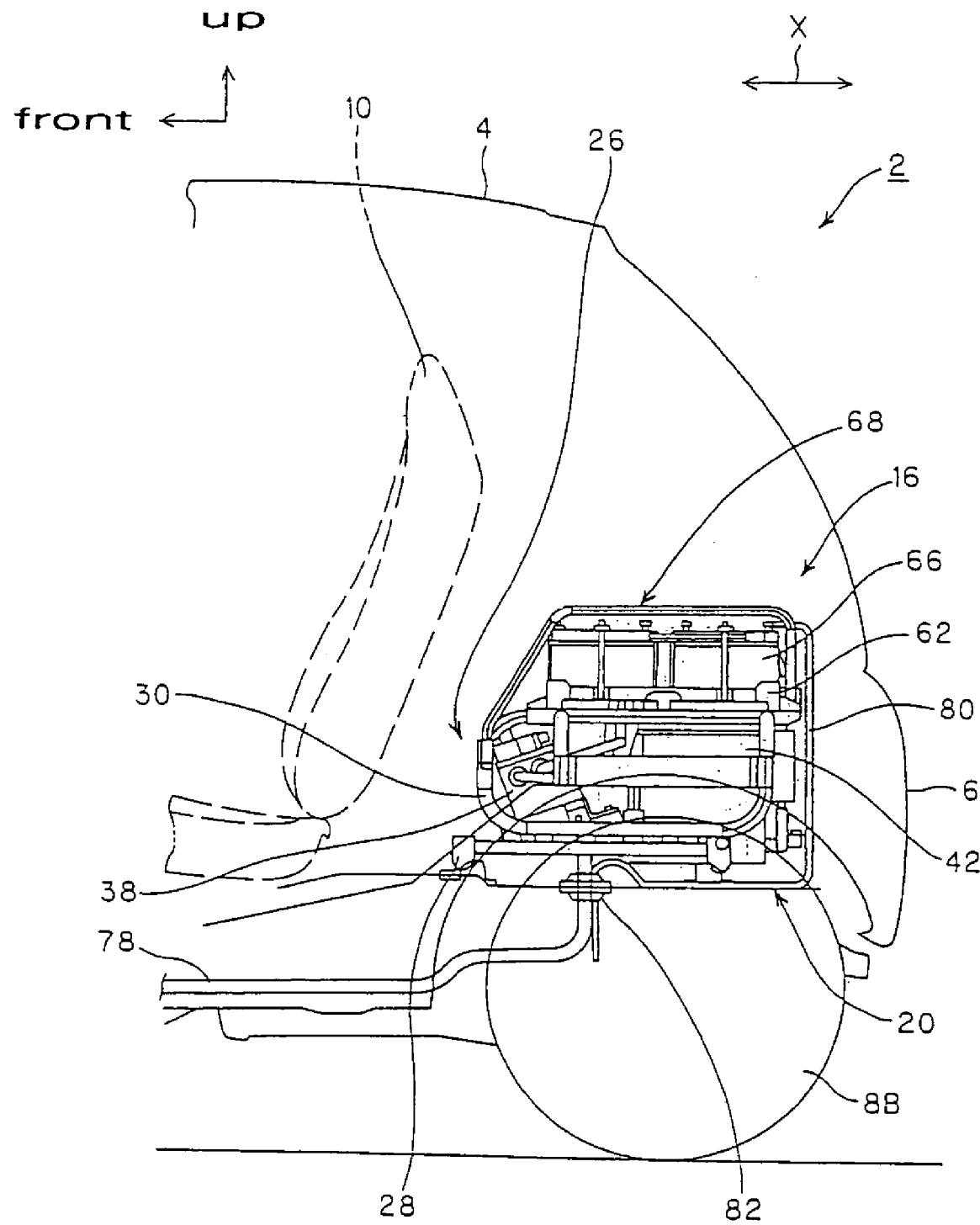
FIG. 4 is a side view of the electrical component support apparatus, according to an aspect of the present invention.
Figure 5:
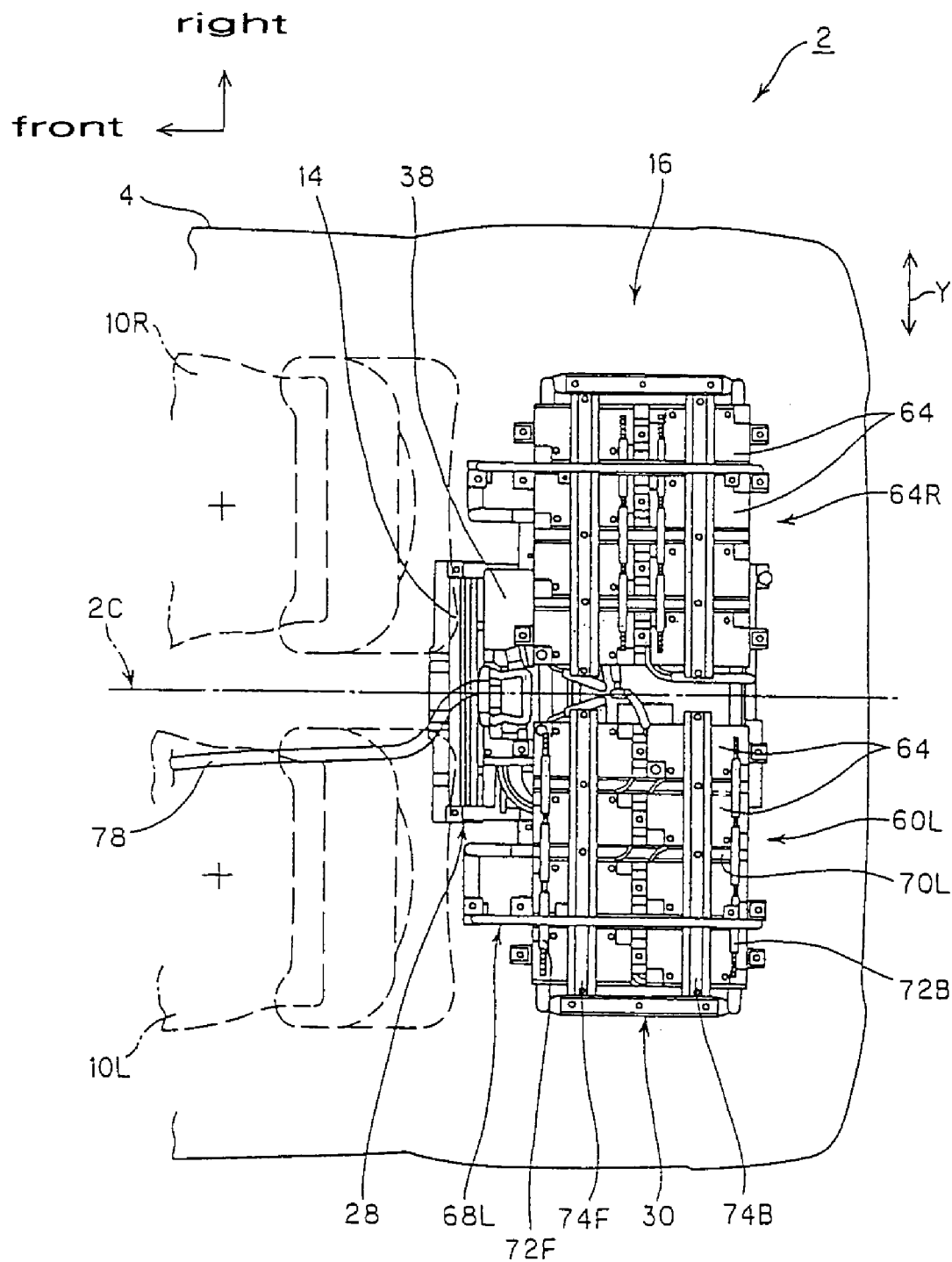
FIG. 5 is a plan view of the electrical component support apparatus, according to an aspect of the present invention.
Figure 6:
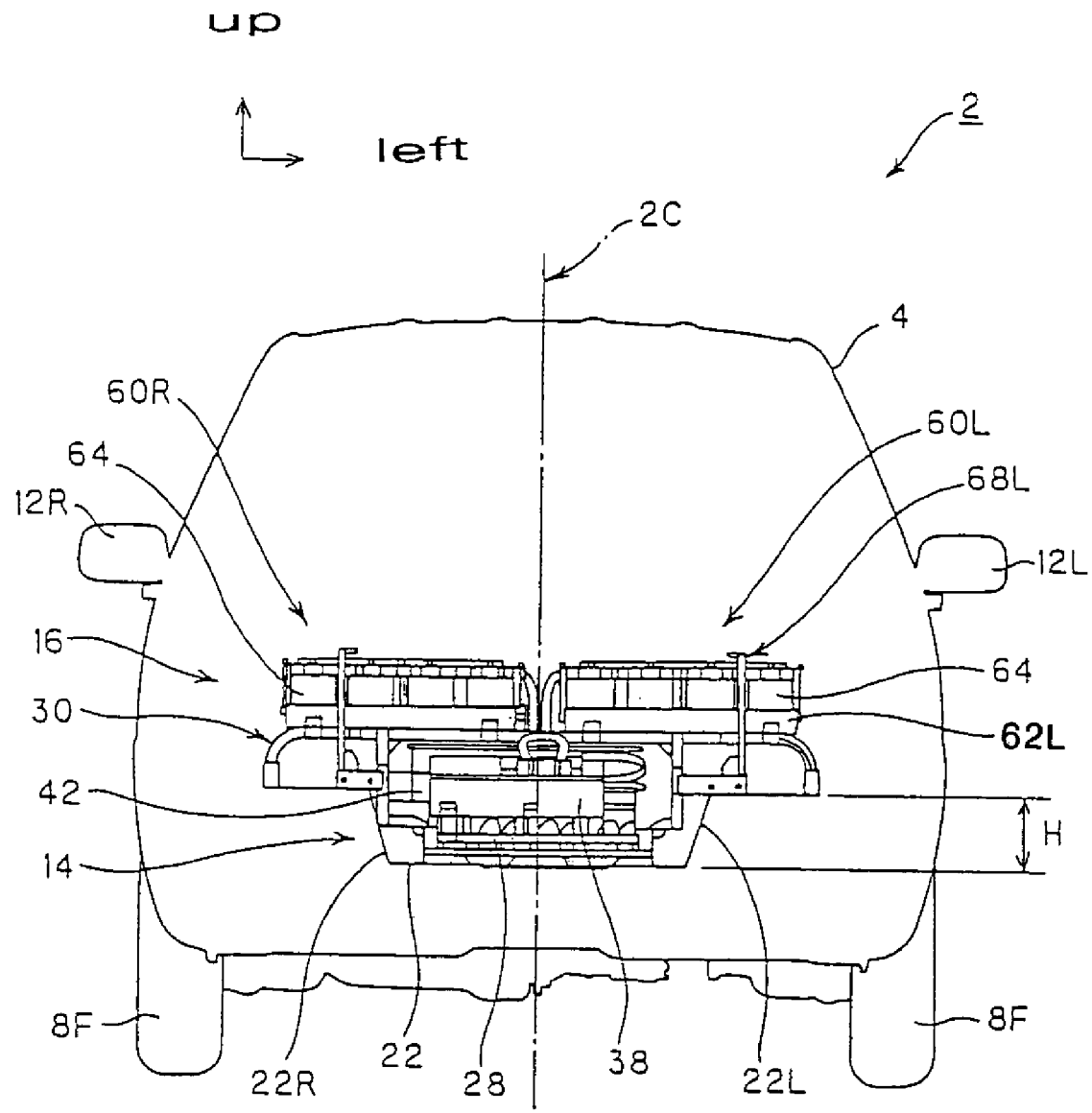
FIG. 6 is a front view of the vehicle that includes a view of the electrical component support apparatus, according to an aspect of the present invention.

FIGS. 1 through 6 illustrate an embodiment of the present invention. Referring initially to FIGS. 4 through 6, a vehicle 2 includes a vehicle body 4, a rear bumper 6, front wheels 8F, rear wheels 8B, a left seat 10L, a right seat 10R, a left rear-view mirror 12L, a right rear-view mirror 12R, a rear floor pan 14, and a vehicle center line 2C. Additionally, batteries 16 are installed on the rear floor pan 14.

Figure 1:
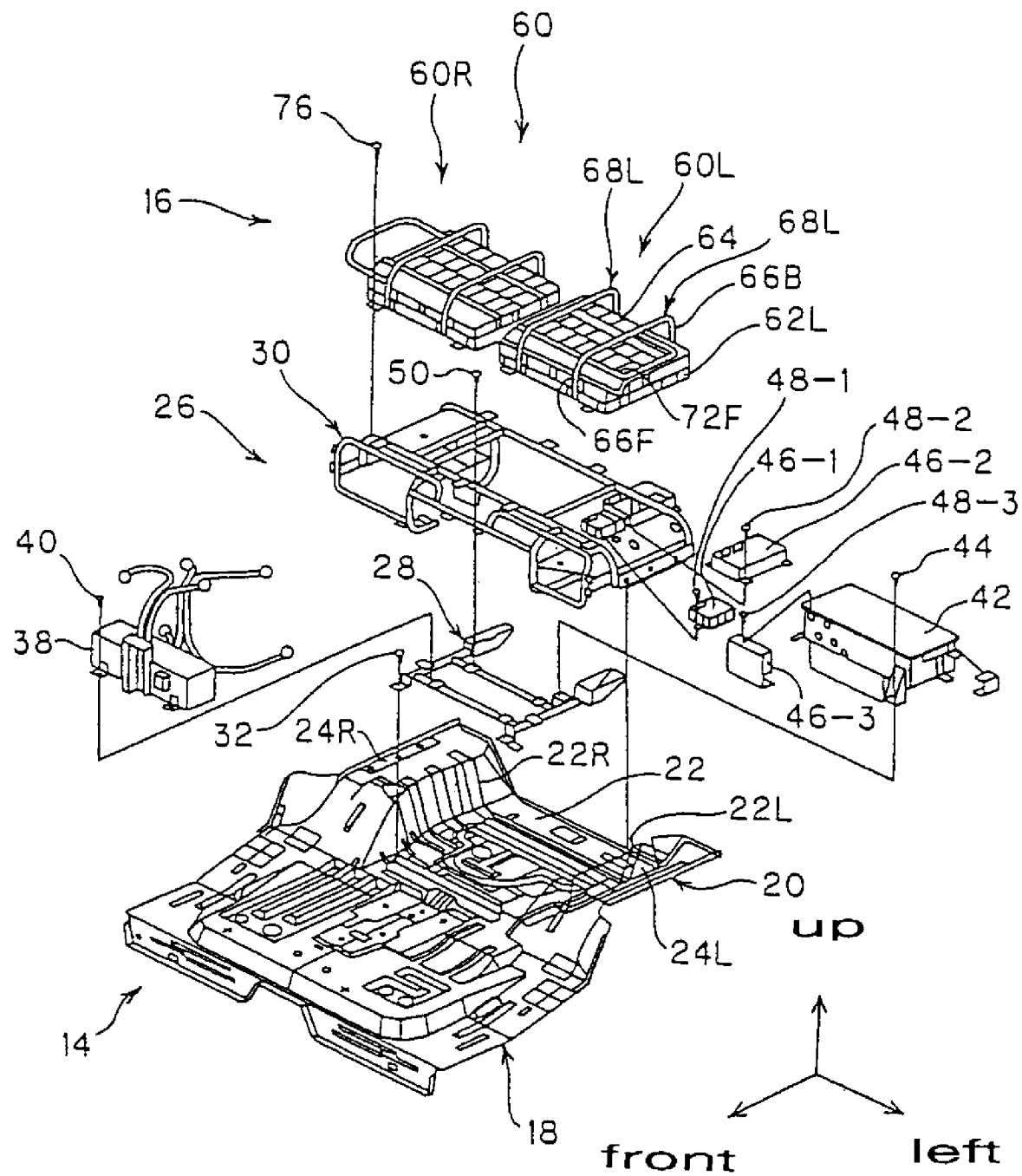
FIG. 1 is an exploded perspective view of an apparatus for attaching electrical components to a vehicle, according to an aspect of the present invention.

As illustrated in FIGS. 1 and 4, the rear floor pan 14 includes a front part 18 that is located directly behind seats 10, and a rear part 20 that is integral to and extends rearward from the front part 18. The rear part 20 includes a U-shaped floor pan 22 (hereinafter referred to as the U-pan 22) that is formed in the center of and along the transverse (Y) direction of the vehicle, left and right riser panels 22L and 22R that extend upward to a height H, and left and right floor pan wing panels 24L and 24R that are attached to side panels (not shown) of the vehicle body. In other words, as shown in FIG. 6, the lower part of U-pan 22 defines the lower point of height dimension H which extends upward to the left and right floor pan wing panels 24L and 24R.

An electrical component rack 26 (hereinafter referred to as the EC rack 26) is attached to the U-pan 22. The EC rack 26 includes a first frame 28, and a second frame 30 that is attached to a top of the first frame 28.

As illustrated in FIG. 1, the first frame 28 attaches to the U-pan 22 via first mounting bolts 32, which are located at positions so as not to interfere with right and left wheel wells (not shown) of the vehicle 2. As illustrated in FIG. 2, the first frame 28 includes first left and right stays 34L and 34R, which are oriented along the fore-aft (X) direction, and first forward and back stays 36F and 36B, which are oriented along the transverse (Y) direction and that serve as connecting members for the first left and right stays 34L and 34R. As a result of this structure, the first frame 28 is able to reinforce the rear floor pan 14 in the vehicle's fore-aft (X) direction.

As illustrated in FIGS. 1, 4, and 5, a junction box 38 is mounted to the front of the first frame 28 by junction box mounting bolts 40. Also, an electrical inverter 42 is mounted to the first frame 28 by inverter mounting bolts 44. Furthermore, other electric components, such as first through third components 46-1 through 46-3, can be installed to the first frame 28 at specific locations using first through third component mounting bolts 48-1 through 48-3.

As illustrated in FIG. 1, the second frame 30 is attached to the top of first frame 28 via second mounting bolts 50, and is connected to the left and right floor pan wing panels 24L and 24R at the ends of the U-pan 22, and as a result, is able to secure components that cannot be attached directly to the rear floor pan 14. As shown in FIG. 3, the second frame 30 includes left and right stays 52L and 52R that are oriented in the fore-aft (X) direction, second front and back stays 54F and 54B that are oriented in the transverse (Y) direction, C-shaped left and right extension stays 56L and 56R, and a cross brace 58 that connects the stays 56L and 56R in the transverse (Y) direction. This configuration allows the second frame 30 to function as a reinforcing cross member that connects both wheel wells (not shown), and thus strengthen the vehicle body 4 in the transverse (Y) direction.

Referring again to FIG. 1, a battery assembly 60, attached to the second frame 30, includes left battery frame 60L and right battery frame 60R, arranged in end-to-end alignment in the transverse (Y) direction.

Multiple electrical batteries 64 (which may be arranged, for example, in two rows of four batteries each) are installed in a left battery tray 62L in the left battery frame 60L. A left battery stay 68L, being an approximately C-shaped member that includes front and back parts 66F and 66B, extends over the top and around the sides of the batteries 64 and is fixedly attached to the left battery tray 62L. The left battery stay 68L includes left stays 70L, which are oriented in the fore-aft (X) direction, and which join to front and back stays 72F and 72B that are oriented in the transverse (Y) direction. Furthermore, as shown in FIG. 5, a pair of front and back battery hold-down rails 74F and 74B are attached to the left battery stays 68L over each electrical battery 64. This configuration allows each of the battery trays 62 to be used to transport the batteries 64. Moreover, third mounting bolts 76 are used to mount the battery stays 68L to the top of the second frame 30. Because right battery stay 68R is identical to the left battery stay 68L, a description of right battery stay 68R has not been included.

One end of an electrical power line 78 and one end of an exhaust gas hose 80 are attached to each battery 64. The purpose of the exhaust gas hose 80 is to provide a path for the escape of hydrogen gas generated during battery charging operations. The electrical power line 78 and the exhaust gas hose 80 are attached at the underside of a rear portion of batteries 16, and are supported by a grommet 82 installed to the rear floor pan 14. The other end of the electrical power line 78 is attached to a traction motor (not shown in the drawings) at the front of the vehicle. The other end of exhaust gas hose 80 is exposed in the downward direction beneath the rear floor pan 14.

An overall discussion of the structure for attaching electrical components to a vehicle will now be discussed. The rear floor pan 14 is formed to include the U-pan 22, which is centered in the transverse (Y) direction, and the left and right floor pan wing panels 24L and 24R that connect to the side panels of the vehicle. The second frame 30 is attached to the top of the first frame 28, which is in turn attached to the U-pan 22. The second frame 30 thus serves as a connecting member between the left and right floor pan wing panels 24L and 24R of the rear floor panel 14. With the inverter 42 attached to the first frame 28, and the batteries 64 to the second frame 30, the first frame 28 is able to provide a reinforcing function that strengthens the rear floor pan 14 part of the vehicle body in the fore-aft (X) direction. Moreover, the second frame 30 serves as a structural cross member that reinforces the vehicle body in the transverse (Y) direction. Therefore, the attachment of the second frame 30 to the wing panels 24 and to the top of the first frame 28 has the effect of increasing the overall rigidity of the rear floor pan 14, which increases the strength of the vehicle body, thus providing a sufficiently strong support structure for the battery assembly 60, which is able to more rigidly support the batteries 64.

Furthermore, the attachment of the EC support member 26 to the U-pan 22 of the rear floor pan 14 behind seat 10 enables an efficient use of available space, and allows electrical components to be mounted without intruding into the wheel well spaces.

The battery stays 68, which are approximately C-shaped members that include the front and back parts 66F and 66B, and that extend over the top and around the sides of the batteries 64, are fixedly attached to the battery trays 62. By positioning the battery hold-down rails 74 over the batteries 64 and attaching them to the battery stays 68, a structure is formed that allows the battery stays 68 to be used to transport the battery trays 62, and also serves as a member to which the hold-down rails 74 can be attached. This arrangement reduces the weight and the number of components needed to form the battery support structure.

Although the invention has been described with reference to an exemplary embodiment, it is understood that the words that have been used are words of description and illustration, rather than words of limitation. Changes may be made, within the purview of the appended claims, as presently stated and as amended, without departing from the scope and spirit of the present invention in its aspects. Although the invention has been described herein with reference to particular means, materials and embodiments, the invention is not intended to be limited to the particulars disclosed herein. Instead, the invention extends to all functionally equivalent structures, methods and uses, such as are within the scope of the appended claims.

The present disclosure relates to subject matter contained in priority Japanese Application No. 2002-312856, filed on Oct. 28, 2002, which is herein expressly incorporated by reference in its entirety.

What is claimed is:

1. An apparatus for attaching electrical components to a vehicle, said apparatus comprising:
   a rear floor pan positionable behind a seat, said rear floor pan including a transversely positioned U-shaped part aligned on a center axis of the vehicle;
   floor pan wing panels extending from sides of said U-shaped part, said floor pan wing panels being connectable to side panels of the vehicle;
   an electrical component mounting rack comprising a first frame fixedly attached to said U-shaped part of said rear floor pan, and a second frame fixedly attached to a top of said first frame and to said floor pan wing panels;
   an electrical inverter device mounted to said first frame; and electrical batteries mounted to said second frame.

2. The apparatus according to claim 1, further comprising:
   an approximately C-shaped battery stay having two ends attached to a battery tray, said battery stay being positioned over said batteries; and
   battery hold-down rails that are positioned above said batteries and are attached to said battery stay.

3. The apparatus according to claim 1, wherein said floor pan wing panels extend in a lateral direction from upper sides of the U-shaped part.

4. The apparatus according to claim 1, wherein said second frame fixedly attaches to said first frame via a portion extending towards said U-shaped part.

5. The apparatus according to claim 1, wherein said second frame attaches to said floor pan wing panels via a portion extending towards said floor pan wing panels.

6. An apparatus for attaching electrical components to a vehicle, said apparatus comprising:
   a floor pan comprising a substantially U-shaped member positioned along a central axis of the vehicle;
   floor pan wing panels extending from lateral sides of said U-shaped member, said floor pan wing panels being attachable to side panels of the vehicle;
   an electrical component mounting rack comprising a first frame attached to said U-shaped member of said floor pan, and a second frame attached to a top side of said first frame and to said floor pan wing panels; and
   an electrical inverter device mounted to said first frame, wherein said second frame is configured to support at least one battery.

7. The apparatus according to claim 6, further comprising:
   a battery tray;
   a battery stay attached to said battery tray, said battery stay extending over said at least one battery; and
   a battery hold-down rail positioned above said at least one battery.

8. The apparatus according to claim 7, wherein said battery hold-down rail is attached to said battery stay.

9. The apparatus according to claim 7, wherein said battery stay is substantially C-shaped.

10. The apparatus according to claim 7, said second frame further comprising a cross brace connected to said battery stay.

11. The apparatus according to claim 6, said first frame comprising a plurality of connecting members.

12. The apparatus according to claim 6, wherein said floor pan is positioned behind a seat of the vehicle.

13. The apparatus according to claim 6, wherein said floor pan wing panels extend in a lateral direction from upper sides of the U-shaped member.

14. The apparatus according to claim 6, wherein said second frame fixedly attaches to said first frame via a portion extending towards said U-shaped member.

15. The apparatus according to claim 6, wherein said second frame attaches to said floor pan wing panels via a portion extending towards said floor pan wing panels.

\* \* \* \* \*